3,838,107
METHOD OF PREPARING CRYSTALLIZED POLYESTERS
Rene Lemaistre, Autreville, and Francois Juhasz, Chauny, France, assignors to Rhone-Progil, Courbevoie, France
No Drawing. Filed Sept. 17, 1973, Ser. No. 398,235
Claims priority, application France, Sept. 21, 1972, 7233438
Int. Cl. C08g 17/10
U.S. Cl. 260—75 T  8 Claims

ABSTRACT OF THE DISCLOSURE

The preparation of crystallized polyesters of polyethylene glycol fumarate, succinate and/or adipate, in which the ratio of adipic acid and succinic acid to fumaric acid is within the range of 0 to 25:75 in which the polyester has a molecular weight within the range of 1000 to 2000, comprising adding a substance capable of initiating crystallization of the polyester at a temperature within the range of 120° to 180° C. in a first step, holding the polyester at a temperature not less than 100° C. but below the temperature of the polyester in the first step while in the presence of polyester micro-crystals having a composition analogous to that of the polyester to be crystallized, and holding the polyester in a layer having a thickness within the range of 5 to 20 mm. for from 12 to 60 minutes at a temperature within the range of 50° to 70° C.

---

The present invention relates to a continuous method of preparing crystallized polyesters.

In the bonding of glass fibers in the manufacture of mats and for other purposes, use is made of crystallized polyester powders, in particular polyethylene glycol fumarate possessing a high degree of symmetry. The conventional method for preparing these polyesters consists of leaving the polycondensation product of the dicarboxylic acid and the diol to stand for a long period of time, generally in excess of 10 hours, at a clearly defined temperature, after it has been poured to form a thin layer. The resultant product has a melting point extending over a fairly wide range, often in excess of 10° C. This constitutes a disadvantage for the user. The practical impossibility of carrying out continuous and automatic manufacture also constitutes a disadvantage for the manufacturer.

An improved process has recently been described in French Patent No. 1,603,423, which consists of introducing the still fluid polycondensate material, with stirring, into organic liquids which are non-solvents for these polyesters, followed by filtering and drying the precipitated product. The quantity of organic liquid used has to be at least equal to that of the polycondensate, which gives rise to considerable difficulty in the handling and recovery of these generally volatile liquids and also makes it impossible, in practice, to carry out a truly continuous process.

We have found and it is an object of this invention to provide a method for production of crystallized polyesters which soften over a narrow temperautre range which utilizes little or no light solvent and permits continuous production, if required, and with a reduced number of handling stages.

According to one aspect of the invention, there is provided a method of preparing crystallized polyesters having a molecular weight within the range of 1000 to 2000 composed of polyethylene glycol fumarate and optionally polyethylene glycol succinate and/or adipate, the molar ratio of adipic and succinic acids to fumaric acid being from 0 to 25:75, the polyester being crystallized in a first step comprising adding to the polyester, at a temperature within the range of 120° to 180° C., a substance capable of initiating crystallization, a second step comprising holding the polyester at a temperature not less than 100° C. and lower than the temperature of the polyester in said first step, in the presence of polyester microcrystals having a composition analogous to that of the product to be crystallized, and a third step comprising holding the polyester, as a layer from 5 to 20 mm. thick, at a temperature from 50° to 70° C. for from 12 to 60 minutes.

The initiation of crystallization in the first step is preferably carried out in the presence of asbestine. Other solids in the form of fibers or fine particles may also be used, such as zinc stearate or N,N' diethylene tetrachlorophthalimide. These additives may be introduced in a proportion of 0.1% to 5% by weight with respect to the polycondensate.

The second step may be carried out by introducing previously prepared crystals of polyester having a composition and structure analogous to the crystallized product, or by causing the formation of such crystals, in situ, by the addition to the polycondensate of from 1 to 10% of its own weight of an organic liquid which is a non-solvent for the crystallized polyester and preferably is a solvent for amorphous polyester. The previously prepared polyfumarates, with the optional addition of polysuccinate and/or polyadipate serving for the initiation, preferably have a high melting point (above 100° C.).

A preferred liquid is acetone; it is also possible to use other ketones or esters such as acetyl acetone, ethyl acetate, methyl ethyl acetone, methyl isobutyl ketone or a butyl acetate.

The third step is preferably carried out on a plane, heat-conducting surface, which is not attacked or dissolved by the medium referred to above, for example of stainless steel. This third step may advantageously be carried out on a stainless steel conveyor belt maintained at a suitable temperature by the circulation of a thermostatically controlled liquid in heat exchange contact with its lower surface for continuous production. This crystallization may generally be carried out in less than 20 minutes.

After cooling to ambient temperature, the product may be crushed and screened.

The preparation of the polycondensate may be carried out in a known manner, as illustrated in the following Example 1. One of the particularly sought-after polyesters is polyethylene glycol fumarate having a molecular weight of approximately 1000 to 2000. The fumaric acid which enters into the polycondensation reaction may be introduced at the commencement of this reaction or may be produced by isomerization in situ of maleic acid also in known manner.

The crystallized polyesters, prepared in accordance with the method of the invention, generally possess softening temperatures lying within a narrow range, for example from 88° to 90° C. for a polyethylene glycol fumarate having a molecular mass of the order of 1400. They may be used for bonding various materials, in particular the glass fibers of a mat.

The following examples are given by way of illustration, and not by way of limitation, of the practice of this invention:

EXAMPLE 1

2,320 g. of fumaric acid and 1,271 g. of ethylene glycol are introduced into a 6 liter stainless steel reactor, fitted with a rotary stirrer, with a device enabling distillation and condensation of the light products evolved to be carried out, and with inlets and outlets for the introduction of the reactants and for the drawing off of the reaction products. The reaction mixture is raised to a temperature of 185° C., while a cooling fluid thermostatically controlled to approximately 80° C. is passed through the distillation-condensation device, in order to enable the water of condensation to be driven off. After the reactor has been maintained for five hours at the above temperature, the acid value of the medium is 32. The reactor is then cooled under an atmosphere of nitrogen.

When the temperature has dropped to 150° C., 36 g. of crushed asbestine are introduced. Then, at 105° C., 36 g. of polyethylene glycol fumarate microcrystals, having a melting point of 108° C., are introduced. The medium is homogenized for 3 to 4 minutes, then it is poured to a thickness of 6 to 10 mm. onto a plate of stainless steel maintained at 60° C. by circulating cold water in contact with its underside. Instead of this plate, use can be made of a conveyor belt, having one zone which is highly cooled. The temperature of the polyester is reduced, in approximately 3 minutes, from 95° C. (the temperature during pouring) to approximately 66° C. A whitening of the product is observed, indicating the commencement of crystallization. Continuation of crystallization is indicated by a temperature plateau of 3 to 4 minutes at 62° C. One minute after the end of this plateau, the temperature is lowered to approximately 32° C. in 5 minutes.

The total time of crystallization is from 15 to 20 minutes. The melting point of the product is 88/90° C.

The resin is then crushed and screened. Before being used, it may be mixed with additives, notably with catalysts.

EXAMPLE 2

The polycondensate is prepared as in Example 1. The first step of crystallization initiation is also carried out as above, but when the temperature has fallen to 115° C., 180 g. of acetone are introduced gradually into the reactor. Cooling water at ambient temperature (20° C.) is then passed through the distillation-condensation device, while the temperature is maintained in the reactor at 115° C. for 15 minutes. After this, the refrigerant having been removed, the acetone is eliminated by distillation and recovered. Cooling is continued and, after 15 minutes, the contents of the reactor are poured onto a stainless steel plate maintained at 60° C. Crystallization occurs in 50 minutes. After falling to ambient temperature, the product is crushed and screened. Its melting point is from 86° to 90° C.

EXAMPLE 3

2,088 g. of fumaric acid, 236 g. of succinic acid and 1,272 g. of ethylene glycol are introduced into a reactor identical to that of Example 1. Polycondensation is carried out in the same manner as in Example 1. When an acid value of 30 has been reached, the alkyd product is cooled to 150° C. under a flow of inert gas.

At this temperature, 1% by weight asbestine is introduced and cooling of the product is continued to 100° C., at which temperature 1% by weight of microcrystals of polyethylene glycol fumaro-succinate (same molar composition) are introduced.

The product is poured under the conditions used in Example 1.

After 30 to 35 minutes, the product is crystalline and possesses a melting point of 78/82° C. The same result can be obtained with adipic acid instead of succinic acid: in this case the following are introduced to the reaction vessel:

2,088 g. of fumaric acid;
292 g. of adipic acid;
1,272 g. of ethylene glycol.

It will be understood that changes may be made in the details of formulation and operation without departing from the spirit of the invention, especially as defined in the following claims.

We claim:

1. The method of preparing crystallized polyesters having a molecular weight within the range of 1,000 to 2,000, selected from the group consisting of poly(ethylene fumarate), poly(ethylene fumarate - succinate), poly(ethylene fumarate-succinate-adipate) or poly(ethylene fumarate - adipate), the molecular ratio of adipic and succinic acids to fumaric acid being within the range of 0 to 25:75, comprising crystallizing the polyester in a first step comprising adding to the polyester, at a temperature within the range of 120° to 180° C., a substance capable of enabling crystallization, in a second step comprising holding the polyester at a temperature not less than 100° C. but below the temperature of the polyester in the first step, in the presence of polyester microcrystals having a composition analogous to that of the product to be crystallized and in a third step comprising holding the polyester as a layer having a thickness within the range of 5 to 20 mm., at a temperature within the range of 50° to 70° C. for from 12 to 60 minutes.

2. A method of preparing crystallized polyesters as claimed in Claim 1, in which said first step is carried out in the presence of asbestine in the amount of 0.1% to 5% by weight of the polyester.

3. A method of preparing crystallized polyesters as claimed in Claim 1, in which said first step is carried out in the presence of zinc stearate in the amount of 0.1% to 5% by weight of the polyester.

4. A method of preparing crystallized polyesters as claimed in Claim 1, in which said first step is carried out in the presence of N,N' diethylene tetrachlorophthalimide in the amount of 0.1% to 5% by weight of the polyester.

5. A method of preparing crystallized polyesters as claimed in Claim 1, in which said second step is carried out with seeding of previously prepared crystals of polyester having a structure and composition analogous to the polyester to be crystallized and having a melting point above 100° C.

6. A method of preparing crystallized polyesters as claimed in Claim 1, in which said second step includes the step causing the formation in situ of polyester microcrystals by the addition of 1% to 10% by weight, relative to the polyester, of an organic liquid which is a solvent for amorphous polyester and a non-solvent for crystallized polyester.

7. A method of preparing crystallized polyesters as claimed in Claim 6, in which the organic fluid is acetone.

8. Crystalline polyesters prepared by the method of Claim 1.

References Cited

UNITED STATES PATENTS

| | | | |
|---|---|---|---|
| 3,390,134 | 6/1968 | Kibler | 260—75 T |
| 3,396,128 | 8/1968 | Matumoto, et al. | 260—75 T X |

FOREIGN PATENTS

| | | |
|---|---|---|
| 1,603,423 | 5/1971 | France. |

MELVIN GOLDSTEIN, Primary Examiner

W. C. DANISON, Jr., Assistant Examiner

U.S. Cl. X.R.

117—126 GB, 161 K; 260—75 UA